United States Patent
Dierks et al.

(10) Patent No.: US 12,026,594 B2
(45) Date of Patent: Jul. 2, 2024

(54) ELECTRONIC DEVICE AND METHOD OF SETTING PROCESSING PARAMETERS

(71) Applicant: Rohde & Schwarz GmbH & Co. KG, Munich (DE)

(72) Inventors: Stefan Dierks, Munich (DE); Timo Mayer, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 726 days.

(21) Appl. No.: 17/234,413

(22) Filed: Apr. 19, 2021

(65) Prior Publication Data
US 2022/0335327 A1    Oct. 20, 2022

(51) Int. Cl.
*G06F 9/448* (2018.01)
*G06F 3/04847* (2022.01)
*G06N 20/00* (2019.01)
*G06F 3/0488* (2022.01)

(52) U.S. Cl.
CPC ......... *G06N 20/00* (2019.01); *G06F 3/04847* (2013.01); *G06F 3/0488* (2013.01)

(58) Field of Classification Search
CPC .......... G06N 20/00; G06N 3/088; G06N 3/09; G06N 3/092; G06N 3/096; G06F 3/04847; G06F 3/0488; G06F 1/1671; G06F 3/0489
See application file for complete search history.

(56) References Cited

U.S. PATENT DOCUMENTS

| 2021/0081722 | A1 | 3/2021 | Restle |
| 2022/0011733 | A1* | 1/2022 | Feilen .................. G06N 3/02 |
| 2022/0100531 | A1* | 3/2022 | Sano .................. G06N 20/00 |

FOREIGN PATENT DOCUMENTS

| CN | 108241114 B | * | 5/2020 | ......... G01R 31/2836 |
| CN | 108693392 B | * | 1/2023 | ......... G01R 13/0209 |
| WO | WO-2020250843 A1 | * | 12/2020 | ............ G06F 9/4494 |

* cited by examiner

*Primary Examiner* — Hassan Mrabi
(74) *Attorney, Agent, or Firm* — CHRISTENSEN O'CONNOR JOHNSON KINDNESS PLLC (57) ABSTRACT

An electronic device is described. The electronic device includes a signal input, a user interface, a signal processing circuit, and an artificial intelligence circuit. The user interface is configured to detect a first user input, wherein the first user input is associated with an automatic setting of processing parameters of the signal processing circuit. The artificial intelligence circuit is configured to automatically adapt the processing parameters of the signal processing circuit based on the first user input, thereby obtaining a first set of processing parameters. The user interface is configured to detect a second user input, wherein the second user input is associated with an adjustment of the processing parameters of the signal processing circuit. The user interface is configured to adapt the processing parameters of the signal processing circuit based on the second user input, thereby obtaining a second set of processing parameters. The artificial intelligence circuit is configured to adapt the first set of processing parameters based on the first set of processing parameters and the second set of processing parameters, thereby obtaining an adapted set of processing parameters. Further, a method of setting processing parameters of an electronic device is described.

20 Claims, 2 Drawing Sheets

ELECTRONIC DEVICE AND METHOD OF SETTING PROCESSING PARAMETERS

FIELD OF THE DISCLOSURE

Embodiments of the present disclosure generally relate to an electronic device. Embodiments of the present disclosure further relate to a method of setting processing parameters of an electronic device.

BACKGROUND

Many different types of electronic devices have an auto-set functionality, wherein processing parameters of the electronic device are automatically set by the electronic device itself.

For example, measurement instruments may have a user interface that allows a user to choose from different measurement modes. After pressing a corresponding button, the user interface may automatically adapt the way that an input signal is displayed in order to match the measurement mode chosen.

However, the preset processing parameters may deviate from the particular processing parameters that are desired by the user. In this case, the user has to adjust the processing parameters manually.

Thus, there is a need for an electronic device as well as a method of setting processing parameters that allow for an improved automatic setting of the processing parameters.

SUMMARY

Embodiments of the present disclosure provide an electronic device. In an embodiment, the electronic device comprises a signal input, a user interface, a signal processing circuit, and an artificial intelligence circuit. The signal input is configured to receive an input signal. The signal processing circuit is configured to process the input signal received via the signal input, thereby obtaining a graphic representation associated with the input signal. The user interface is configured to detect a first user input, wherein the first user input is associated with an automatic setting of processing parameters of the signal processing circuit, which are used by the signal processing circuit for processing the input signal. The artificial intelligence circuit is configured to automatically adapt the processing parameters of the signal processing circuit based on the first user input, thereby obtaining a first set of processing parameters. The user interface is configured to detect a second user input, wherein the second user input is associated with an adjustment of the processing parameters of the signal processing circuit. The user interface is configured to adapt the processing parameters of the signal processing circuit based on the second user input, thereby obtaining a second set of processing parameters. The artificial intelligence circuit is configured to adapt the first set of processing parameters based on the first set of processing parameters and the second set of processing parameters, thereby obtaining an adapted set of processing parameters.

Therein and in the following, the term "user interface" is understood to comprise input means, at least one display, and a control circuit. The input means are configured to detect user inputs. For example, the input means may comprise a touch-sensitive display, buttons and/or knobs, etc., that can be used in order to set the processing parameters of the processing circuit.

In an embodiment, the at least one display is configured to display the graphic representation associated with the input signal. The graphic representation may correspond to the input signal itself, measurement data obtained by the signal processing circuit based on the input signal, or other information regarding the input signal.

In general, the processing parameters of the signal processing circuit determine properties of the graphic representation associated with the input signal. Accordingly, the processing parameters of the signal processing circuit determine how the input signal, the measurement data obtained by the signal processing circuit, and/or the other information regarding the input signal are/is displayed on the display.

In some embodiments, the control circuit is configured to set the processing parameters of the processing circuit based on the second user input.

In some embodiments, the user interface is established as a graphical user interface (GUI).

In general, the electronic device according to the present disclosure is configured to detect whether the automatically set processing parameters, i.e., the first set of processing parameters, deviate from the processing parameters desired by the user.

The electronic device or rather the user interface detects the first user input. The first user input is associated with an automatic setting of the processing circuit. In other words, the electronic device detects that the user wants the processing parameters to be set automatically.

After the processing parameters are automatically set to the first set of processing parameters, the graphic representation associated with the input signal is obtained based on the first set of processing parameters. The graphic representation may be displayed on the at least one display.

The electronic device or rather the user interface then detects the second user input. The second user input is associated with an adjustment of the processing parameters that have already been set automatically. In other words, the user may adjust the automatically set processing parameters, e.g., because the graphic representation displayed on the display does not match the requirements of the user.

The electronic device according to an embodiment of the present disclosure automatically determines whether the adjustment of the processing parameters by the user necessitates an adjustment of the automatically set processing parameters, i.e., of the first set of processing parameters.

For example, if the user adjusts the processing parameters each time, this is a clear indication that the automatically set processing parameters do not match the processing parameters desired by the user. On the other hand, if the user adjusts the automatically set processing parameters only once, but has already used the automatically set processing parameters a number of times, this is an indication that the automatically set processing parameters do not need to be changed.

If the electronic device determines that the first set of processing parameters is to be adjusted, the artificial intelligence circuit automatically adapts the first set of processing parameters.

In some embodiments, the first set of processing parameters may be automatically adapted to match the second set of processing parameters input by the user. In other words, the adapted set of processing parameters may be equal to the second set of processing parameters.

The adapted set of processing parameters replaces the first set of processing parameters. Thus, if the first user input is detected in a future use of the electronic device, the processing parameters of the processing circuit are automatically set to the adapted set of processing parameters.

Accordingly, the electronic device according to embodiments of the present disclosure is a self-learning electronic device that can adapt the automatic setting of the processing parameters such that the individual requirements of the user are met.

According to an aspect of the present disclosure, the artificial intelligence circuit is configured to adapt the first set of processing parameters based on the input signal. The first set of processing parameters may be associated with a specific class or type of input signal. Thus, there may be different first sets of processing parameters for different classes or types of input signals.

The artificial intelligence circuit may be configured to adapt only the first set of processing parameters that the user has adjusted via the second user input. Put differently, only presets of the electronic device that are in fact adjusted by the user are adapted automatically. On the other hand, presets that have not been adjusted by the user may remain unaltered.

According to another aspect of the present disclosure, the electronic device is established as a test and/or measurement instrument (T&M instrument) or as an RF receiver. For example, the test and/or measurement instrument may be an oscilloscope, a signal analyzer, or a vector network analyzer.

In an embodiment of the present disclosure, the first user input comprises operating an auto-set button of the user interface. Therein and in the following, the term "operating" is understood to mean pressing, turning, touching, or any other type of interaction that indicates a desired activation of the auto-set input or button. By operating the auto-set button, the user indicates that he wishes the electronic device to set the processing parameters automatically.

In a further embodiment of the present disclosure, the second user input comprises operating the auto-set button a second time. If the user operates the auto-set button a second time, this may be an indication that the first set of processing parameters does not match the processing parameters desired by the user. If the user manually adapts the processing parameters after operating the auto-set button a second time, the first set of processing parameters may be automatically adapted to match the second set of processing parameters input by the user.

According to another aspect of the present disclosure, the user interface is configured to determine a time between the first user input and the second user input. In some embodiments, the user interface and/or the artificial intelligence circuit may be configured to determine a time between two presses of the auto-set button. In general, a short time between the two user inputs is an indication that the user is not satisfied with the first set of processing parameters automatically set by the electronic device. Accordingly, the first set of processing parameters may be automatically adapted to match the second set of processing parameters input by the user if a time between the two user inputs is smaller than a predetermined threshold time.

In some embodiments, the artificial intelligence circuit is configured to automatically adapt the processing parameters based on the input signal. The first set of processing parameters may be associated with a specific class or type of input signal. Thus, there may be different first sets of processing parameters for different classes or types of input signals. The artificial intelligence circuit automatically determines the correct first set of processing parameters based on the input signal.

The artificial intelligence circuit may be configured to classify the input signal. Alternatively or additionally, the artificial intelligence circuit may be configured to determine at least one characteristic quantity of the input signal. The artificial intelligence circuit may be configured to set the processing parameters of the processing circuit based on the classification and/or based on the at least one characteristic quantity determined.

According to a further embodiment of the present disclosure, the artificial intelligence circuit comprises a machine-learning circuit. The machine-learning circuit is trained to automatically adapt the processing parameters of the signal processing circuit based on the first user input. Moreover, the machine-learning circuit is trained to adapt the first set of processing parameters based on the first set of processing parameters and the second set of processing parameters, optionally based on the input signal.

In some embodiments, the artificial intelligence circuit comprises an artificial neural network.

According to an aspect of the present disclosure, the machine-learning circuit is configured to adapt the first set of processing parameters by a machine-learning technique. In general, any suitable machine-learning technique may be employed by the machine-learning circuit. For example, few-shot-learning and/or one-shot-learning techniques may be used by the machine-learning circuit.

In some embodiments, the machine-learning circuit may be configured to adapt the first set of processing parameters by an unsupervised learning technique. This way, the first set of processing parameters can be adapted without an intervention of the user being necessary.

The machine-learning circuit may be pre-trained to automatically adapt the processing parameters of the signal processing circuit. The machine-learning circuit may be pre-trained by a manufacturer of the electronic device or by an expert user. The training of the machine-learning circuit may necessitate a large number of different input signals, for example of input signals having different waveforms. During the pre-training, the first set(s) of processing parameters is (are) obtained.

In general, any suitable machine-learning technique may be used in order to pre-train the machine-learning circuit. For example, reinforcement learning and/or supervised learning techniques may be used.

In an embodiment of the present disclosure, the processing parameters comprise at least one of a center frequency, a frequency range, a waveform, an amplitude range, a trigger condition, a trigger mask, a display zoom, a display resolution, a display axis parameter, an display axis scaling factor, a plot range, or a time scaling factor. However, it is to be understood that the processing parameters may comprise any other parameters that are associated with displaying the input signal and/or measurement data associated with the input signal.

In some embodiments, the signal processing circuit may comprise at least one of an application-specific integrated circuit (ASIC), a field-programmable gate array (FPGA), a digital signal processor (DSP), a single purpose processor (SPP), a general purpose processor (GPP), or a memory comprising a computer program product, the computer program product being configured to process the input signal when the computer program product is executed on the general purpose processor. Accordingly, the input signal may be processed by means of hardware and/or software in order to obtain the graphic representation associated with the input signal.

For example, the signal processing circuit comprises dedicated hardware for generating the graphic representation associated with the input signal, i.e., at least one of an ASIC, an FPGA, a DPS, and/or a SPP being configured to generate the graphic representation. Alternatively or additionally, the signal processing circuit comprises a GPP and a memory, wherein a computer program is saved in the memory. The computer program is configured to generate the graphic representation associated with the input signal when the computer program is executed on the GPP. For example, the GPP may be established as a CPU, a microprocessor, etc.

According to an aspect of the present disclosure, the artificial intelligence circuit comprises at least one processor or processor circuit and a memory. The memory comprises a computer program product. The computer program product is configured to automatically adapt the processing parameters of the signal processing circuit based on the first user input when the computer program product is executed on the processor. The computer program product is configured to adapt the first set of processing parameters based on the first set of processing parameters and the second set of processing parameters when the computer program product is executed on the processor. In some embodiments, the processor comprises at least one of an application-specific integrated circuit (ASIC), a field-programmable gate array (FPGA), a digital signal processor (DSP), a single purpose processor (SPP), or a general purpose processor (GPP). In other words, the artificial intelligence circuit in some embodiments comprises software that is configured to adapt the first set of processing parameters and/or to adapt the processing parameters of the signal processing circuit based on suitable artificial intelligence techniques.

According to a further aspect of the present disclosure, the machine-learning circuit comprises at least one processor or processor circuit and a memory. The memory comprises a computer program product, wherein the computer program product is configured to adapt the first set of processing parameters based on the first set of processing parameters and the second set of processing parameters when the computer program product is executed on the processor. In some embodiments, the processor comprises at least one of an application-specific integrated circuit (ASIC), a field-programmable gate array (FPGA), a digital signal processor (DSP), a single purpose processor (SPP), and a general purpose processor (GPP). Thus, the machine-learning circuit in some embodiments comprises software that is configured to adapt the first set of processing parameters based on suitable machine-learning techniques, as already described above. The software may comprise an artificial neural network or any other type of machine-learning software.

Embodiments of the present disclosure further provide a method of setting processing parameters of an electronic device. In an embodiment of the method, the electronic device comprises a signal input, a user interface, a signal processing circuit, and an artificial intelligence circuit. In an embodiment, the method comprises the following steps:
  receiving an input signal via the signal input;
  receiving a first user input via the user interface, wherein the first user input is associated with an automatic setting of processing parameters of the signal processing circuit, which are used by the signal processing circuit for processing the input signal;
  automatically adapting the processing parameters of the signal processing circuit based on the first user input by the artificial intelligence circuit, thereby obtaining a first set of processing parameters;
  processing the input signal by the signal processing circuit, thereby obtaining a graphic representation associated with the input signal;
  receiving a second user input via the user interface, wherein the second user input is associated with an adjustment of the processing parameters of the signal processing circuit;
  adapting the processing parameters of the signal processing circuit based on the second user input by the user interface, thereby obtaining a second set of processing parameters; and
  adapting the first set of processing parameters based on the first set of processing parameters and the second set of processing parameters by the artificial intelligence circuit, thereby obtaining an adapted set of processing parameters.

In some embodiments, embodiments of the electronic device described above are configured to perform the disclosed methods of setting processing parameters of an electronic device.

Regarding the advantages and further properties of the method, reference is made to the explanations given above with respect to the electronic device, which also hold for the method and vice versa.

According to an aspect of the present disclosure, the first set of processing parameters is adapted based on the input signal by the artificial intelligence circuit. The first set of processing parameters may be associated with a specific class or type of input signal. Thus, there may be different first sets of processing parameters for different classes or types of input signals.

The artificial intelligence circuit may adapt only the first set of processing parameters that the user has adjusted via the second user input. Put differently, only presets of the electronic device that are in fact adjusted by the user are adapted automatically. On the other hand, presets that have not been adjusted by the user may remain unaltered.

According to another aspect of the present disclosure, the input signal is a measurement signal to be analyzed or an RF signal to be received. Accordingly, the electronic device may be established as a test and/or measurement instrument (T&M instrument) or as an RF receiver. For example, the test and/or measurement instrument may be an oscilloscope, a signal analyzer, or a vector network analyzer.

According to a further aspect of the present disclosure, the first user input comprises operating an auto-set input or button of the user interface. Therein and in the following, the term "operating" is understood to mean pressing, turning, touching, or any other type of interaction that indicates a desired activation of the auto-set button. By operating the auto-set button, the user indicates that he wishes the electronic device to set the processing parameters automatically.

In an embodiment of the present disclosure, the second user input comprises operating the auto-set button a second time. If the user operates the auto-set button a second time, this may be an indication that the first set of processing parameters does not match the processing parameters desired by the user. If the user manually adapts the processing parameters after operating the auto-set button a second time, the first set of processing parameters may be automatically adapted to match the second set of processing parameters input by the user.

A time between the first user input and the second user input may be determined by the user interface. In some embodiments, a time between two presses of the auto-set button may be determined. In general, a short time between the two user inputs is an indication that the user is not satisfied with the first set of processing parameters automatically set by the electronic device. Accordingly, the first set of processing parameters may be automatically adapted to match the second set of processing parameters input by the user if a time between the two user inputs is smaller than a predetermined threshold time.

In a further embodiment of the present disclosure, the artificial intelligence circuit comprises a machine-learning circuit. The machine-learning circuit is trained to automatically adapt the processing parameters of the signal processing circuit based on the first user input. Moreover, the machine-learning circuit is trained to adapt the first set of processing parameters based on the first set of processing parameters and the second set of processing parameters, optionally based on the input signal.

In some embodiments, the artificial intelligence circuit comprises an artificial neural network.

According to an aspect of the present disclosure, the first set of processing parameters is automatically adapted via a machine-learning technique by the machine-learning circuit. In general, any suitable machine-learning technique may be employed by the machine-learning circuit. For example, few-shot-learning and/or one-shot-learning techniques may be used.

In some embodiments, the first set of processing parameters may be adapted by an unsupervised learning technique. This way, the first set of processing parameters can be adapted without an intervention of the user being necessary.

According to another aspect of the present disclosure, the machine-learning circuit is pre-trained to automatically adapt the processing parameters of the signal processing circuit. The machine-learning circuit may be pre-trained by a manufacturer of the electronic device or by an expert user. The training of the machine-learning circuit may necessitate a large number of different input signals, for example of input signals having different waveforms. During the pre-training, the first set(s) of processing parameters is (are) obtained.

In general, any suitable machine-learning technique may be used in order to pre-train the machine-learning circuit. For example, reinforcement learning and/or supervised learning techniques may be used.

In an embodiment of the present disclosure, the processing parameters comprise at least one of a center frequency, a frequency range, a waveform, an amplitude range, a trigger condition, a trigger mask, a display zoom, a display resolution, a display axis parameter, an display axis scaling factor, a plot range, or a time scaling factor. However, it is to be understood that the processing parameters may comprise any other parameters that are associated with displaying the input signal and/or measurement data associated with the input signal.

Generally, the processing parameters may be used for generating the graphic representation associated with the input signal, namely in the desired manner.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
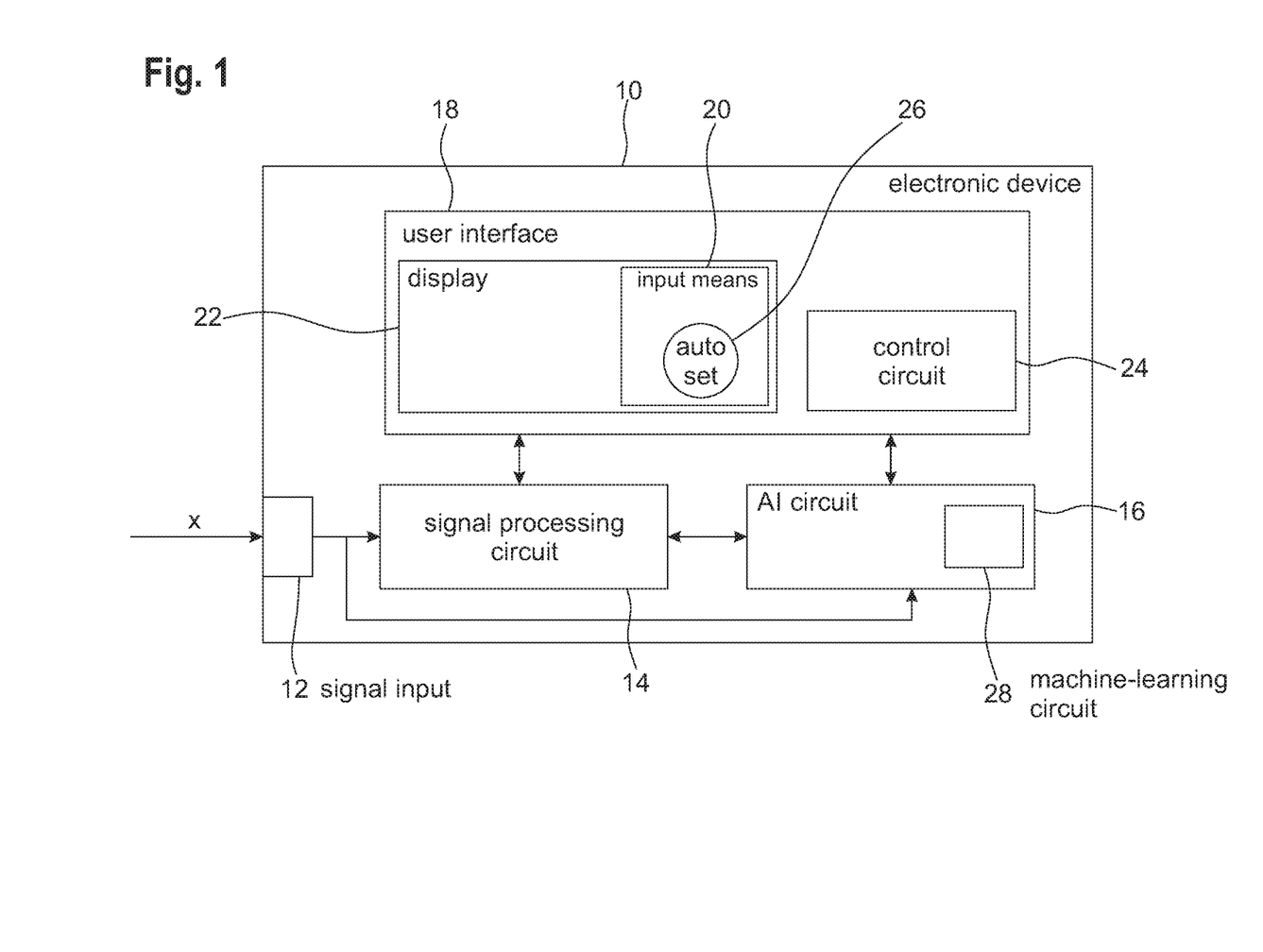
FIG. 1 schematically shows an electronic device according to an embodiment of the present disclosure.

FIG. 1 schematically shows an electronic device 10. The electronic device 10 is configured to receive and process an input signal x. The electronic device 10 may be established, for example, as a test and/or measurement instrument (T&M instrument). For example, the electronic device 10 may be established as an oscilloscope, as a signal analyzer, or as a vector network analyzer. Accordingly, the input signal x may be an output signal of a device under test that is to be tested by the electronic device 10. Alternatively, the electronic device 10 may be established as an RF receiver. In this case, the input signal x may be established as an RF signal to be received by the electronic device 10.

The electronic device 10 comprises a signal input 12, a signal processing circuit 14, an artificial intelligence circuit 16, and a user interface 18. The signal input 12 is connected to the signal processing circuit 14 and to the artificial intelligence circuit 16, such that the input signal x received by the signal input 12 is forwarded to both the signal processing circuit 14 and the artificial intelligence circuit 16.

It is noted that the input signal x may be received via a cable attached to the signal input 12. Alternatively, the input signal x may be a wireless signal and may be received by means of corresponding receiving circuitry of the signal input 12, for example by an antenna associated with the signal input 12.

The signal processing circuit 14 is configured to process the input signal x based on processing parameters of the signal processing circuit 14, thereby generating a graphic representation associated with the input signal. In general, the processing parameters determine how the signal processing circuit 14 processes and/or analyzes the input signal x. The processing parameters may comprise at least one of a center frequency, a frequency range, a waveform, an amplitude range, a trigger condition, a trigger mask, a display zoom, a display resolution, a display axis parameter, an display axis scaling factor, a plot range, or a time scaling factor. However, it is to be understood that the processing parameters may comprise any other parameters that are associated with a processing of the input signal x.

The graphic representation may correspond to the input signal itself, measurement data obtained by the signal processing circuit 14 based on the input signal x, or other information regarding the input signal x.

The user interface may be established as a graphical user interface (GUI). In some embodiments, the user interface 18 comprises input means 20, a display 22, and a control circuit 24. The input means 20 are configured to detect user inputs. For example, the input means may comprise a touch-sensitive display, buttons and/or knobs, etc., that can be operated by the user in order to set the processing parameters of the processing circuit.

In some embodiments, the input means 20 comprise an auto-set input or button 26. The functionality of the auto-set button will be described in more detail below. The display 22 is configured to display the graphic representation associated with the input signal x.

The control circuit 24 is configured to adapt the processing parameters of the signal processing circuit 14 based on a user input received via the input means 20. The artificial intelligence circuit 16 comprises a machine-learning circuit 28. In general, the machine-learning circuit 28 is configured to adapt the processing parameters of the signal processing circuit 14 automatically. In an embodiment, the machine-learning circuit 28 may comprise an artificial neural network. The functionality of the machine-learning circuit 28 will be described in more detail below.

In an aspect of the disclosure, the electronic device 10 can be a self-learning electronic device that can automatically set the processing parameters of the signal processing circuit 14. Moreover, the electronic device 10 is configured, for example, to adapt the automatic setting of the processing parameters if necessary, such that individual requirements of a user of the electronic device 10 are met.

Figure 2:
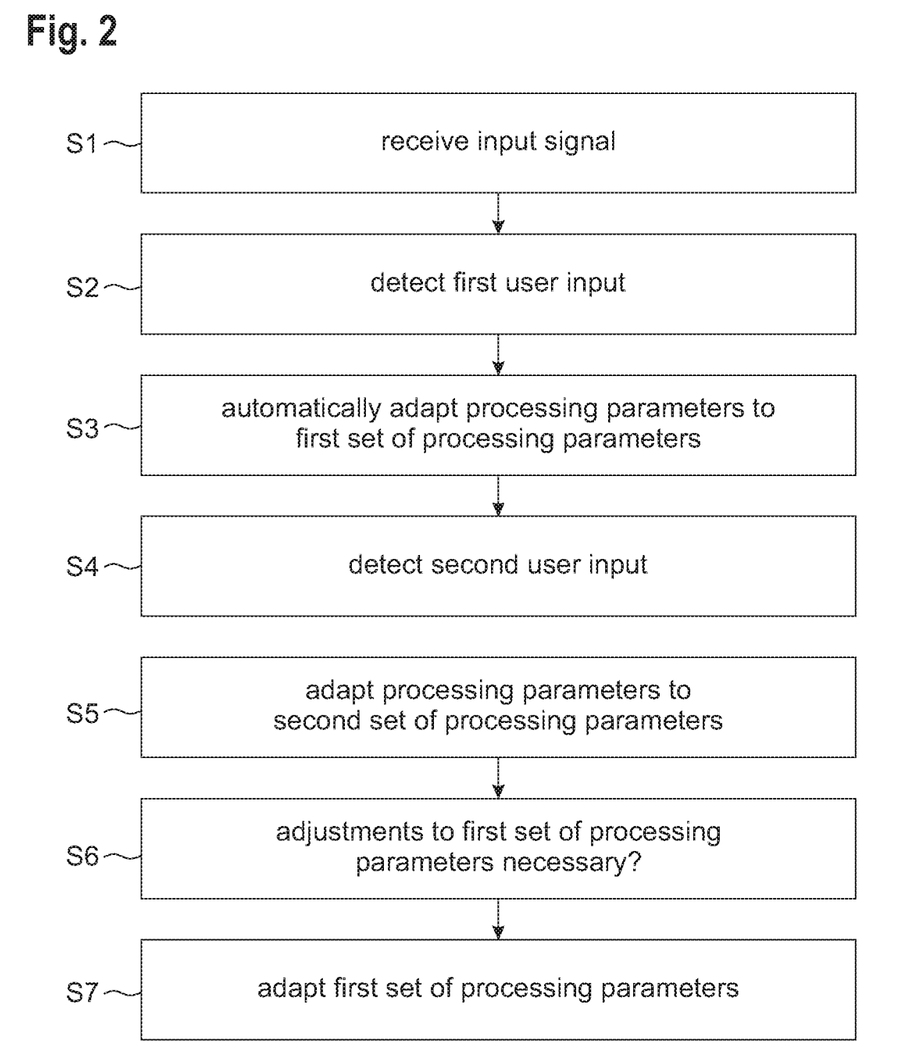
FIG. 2 schematically shows a flow chart of a representative method of setting processing parameters of the electronic device of FIG. 1 according to an embodiment of the present disclosure.

More precisely, the electronic device 10 is configured to perform a method of setting processing parameters of the signal processing circuit 14, for example, the methods that are described in the following with reference to FIG. 2.

The input signal x is received by the signal input 12 (step S1). The input signal x is forwarded to both the signal processing circuit and the artificial intelligence circuit 16.

A first user input is detected by the user interface 18 (step S2). More precisely, the first user input is detected by the input means 20. In general, the first user input is associated with an automatic setting of the processing parameters of the signal processing circuit 14. For example, the user may operate the auto-set button 26, thereby expressing the wish that the electronic device 10 automatically sets the processing parameters of the signal processing circuit 14.

Based on the first user input, the control circuit 24 issues a corresponding control command to the artificial intelligence circuit 16. The processing parameters of the signal processing circuit 14 are automatically adapted by the artificial intelligence circuit 16 based on the first user input, for example based on the corresponding control commands of the control circuits 24, thereby obtaining a first set of processing parameters (step S3).

The first set of processing parameters corresponds to a certain graphic representation of the input signal or of measurement data associated with the input signal. Accordingly, the signal processing circuit processes the input signal x based on the first set of processing parameters, thereby obtaining a first graphic representation associated with the input signal x. The first graphic representation is displayed on the display 22. Optionally, the artificial intelligence circuit 16 may automatically adapt the processing parameters based on the input signal x.

Therein, the first set of processing parameters may be associated with a specific class or type of input signal. Thus, there may be different first sets of processing parameters for different classes or types of input signals. The artificial intelligence circuit 16 automatically determines the correct first set of processing parameters based on the input signal x.

The artificial intelligence circuit 16 may classify the input signal in order to determine the correct first set of processing parameters. Alternatively or additionally, the artificial intelligence circuit 16 may determine at least one characteristic quantity of the input signal x.

The artificial intelligence circuit 16 may set the processing parameters of the signal processing circuit 14 based on the classification and/or based on the at least one characteristic quantity determined.

In some embodiments, the machine-learning circuit 28 is pre-trained to automatically set the processing parameters of the signal processing circuit 14 based on the first user input, for example based on the input signal x. The machine-learning circuit 28 may be pre-trained by a manufacturer of the electronic device 10 or by an expert user.

The training of the machine-learning circuit 28 may necessitate a large number of different input signals, for example of input signals having different waveforms. During the pre-training, the first set(s) of processing parameters is (are) obtained. In general, any suitable machine-learning technique may be used in order to pre-train the machine-learning circuit 28. For example, reinforcement learning and/or supervised learning techniques may be used.

A second user input is detected by the user interface 18 (step S4). More precisely, the second user input is detected by the input means 20.

In general, the second user input is associated with an adjustment of the processing parameters of the signal processing circuit 14. More precisely, the second user input is associated with an adjustment of the processing parameters of the signal processing circuit 14 away from the first set of processing parameters automatically set by the artificial intelligence circuit 16. In other words, the second user input expresses a desire of the user to deviate from the first set of processing parameters. For example, this may be the case if the first graphic representation displayed on the display 22 does not meet the expectations and/or requirements of the user.

The control circuit 24 adapts the processing parameters of the signal processing circuit 14 based on the second user input, thereby obtaining a second set of processing parameters that is different from the first set of processing parameters (step S5).

The electronic device 10, for example the artificial intelligence circuit 16, determines whether an adjustment of the first set of processing parameters is necessary based on the second user input and based on the second set of processing parameters (step S6).

The artificial intelligence circuit 16 may count the number of times that the user has changed the processing parameters away from the first set of processing parameters. For example, if the user adjusts the processing parameters away from the first set of processing parameters each time, this is a clear indication that the automatically set processing parameters do not match the processing parameters desired by the user. Thus, the artificial intelligence circuit 16 may conclude that the first set of processing parameters needs to be adapted.

On the other hand, if the user adjusts the automatically set processing parameters only once, but has already used the automatically set processing parameters a number of times, this is an indication that the first set of processing parameters does not need to be changed.

Alternatively or additionally, the second user input may comprise operating the auto-set button a second time. If the user operates the auto-set button a second time, this may be an indication that the first set of processing parameters does not match the processing parameters desired by the user.

Thus, the artificial intelligence circuit 16 may conclude that the first set of processing parameters needs to be adapted in this case.

Alternatively or additionally, a time between the first user input and the second user input may be determined by the control circuits 24 and/or by the artificial intelligence circuit 16. A short time between the two user inputs may be an indication that the user is not satisfied with the first set of processing parameters. Thus, if the time between the two user inputs is smaller than a predetermined threshold time, the artificial intelligence circuit 16 may conclude that the first set of processing parameters needs to be adapted.

If the artificial intelligence circuit 16 determines that the first set of processing parameters needs to be adapted, the first set of processing parameters is automatically adapted by the artificial intelligence circuit 16, thereby obtaining an adapted set of processing parameters (step S7).

The machine-learning circuit 28 is trained to adapt the first set of processing parameters based on the first set of processing parameters and the second set of processing parameters, for example additionally based on the input signal.

In some embodiments, the machine-learning 28 circuit is configured to adapt the first set of processing parameters by a few-shot-learning technique, a one-shot learning technique, and/or an unsupervised learning technique. This way, the first set of processing parameters can be adapted without an intervention of the user being necessary.

The adapted set of processing parameters replaces the first set of processing parameters. Accordingly, if the first user input is detected in a future use of the electronic device 10, the processing parameters of the processing circuit 14 are automatically set to the adapted set of processing parameters instead of the first set of processing parameters.

As already described above, there may be different first sets of processing parameters for different classes or types of input signals.

The artificial intelligence circuit 16 may be configured to adapt only the first set of processing parameters that the user has adjusted via the second user input. Put differently, only presets (i.e. first sets of processing parameters) of the electronic device 10 that are in fact adjusted by the user are adapted automatically. On the other hand, presets that have not been adjusted by the user may remain unaltered.

The input signal may be re-processed by the signal processing circuit 14 based on the second set of processing parameters, thereby obtaining a second graphic representation associated with the input signal x. The second graphic representation may be displayed on the display 22.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An electronic device, the electronic device comprising a signal input, a user interface, a signal processing circuit, and an artificial intelligence circuit,
    wherein the signal input is configured to receive an input signal,
    wherein the signal processing circuit is configured to process the input signal received via the signal input, thereby obtaining a graphic representation associated with the input signal,
    wherein the user interface is configured to detect a first user input, wherein the first user input is associated with an automatic setting of processing parameters of the signal processing circuit, which are used by the signal processing circuit for processing the input signal,
    wherein the artificial intelligence circuit is configured to automatically adapt the processing parameters of the signal processing circuit based on the first user input, thereby obtaining a first set of processing parameters, wherein the user interface is configured to detect a second user input, wherein the second user input is associated with an adjustment of the processing parameters of the signal processing circuit, wherein the user interface is configured to adapt the processing parameters of the signal processing circuit based on the second user input, thereby obtaining a second set of processing parameters, and wherein the artificial intelligence circuit is configured to adapt the first set of processing parameters based on the first set of processing parameters and the second set of processing parameters, thereby obtaining an adapted set of processing parameters.

2. The electronic device of claim 1, wherein the artificial intelligence circuit is configured to adapt the first set of processing parameters based on the input signal.

3. The electronic device of claim 1, wherein the electronic device is established as a test and/or measurement instrument or as an RF receiver.

4. The electronic device of claim 1, wherein the first user input comprises operating an auto-set button of the user interface.

5. The electronic device of claim 4, wherein the second user input comprises operating the auto-set button a second time.

6. The electronic device of claim 1, wherein the user interface is configured to determine a time between the first user input and the second user input.

7. The electronic device of claim 1, wherein the artificial intelligence circuit is configured to automatically adapt the processing parameters based on the input signal.

8. The electronic device of claim 1, wherein the artificial intelligence circuit comprises a machine-learning circuit.

9. The electronic device of claim 8, wherein the machine-learning circuit is configured to adapt the first set of processing parameters by a machine-learning technique and/or wherein the machine-learning circuit is pre-trained to automatically adapt the processing parameters of the signal processing circuit.

10. The electronic device of claim 8, wherein the machine-learning circuit comprises at least one processor and a memory, the memory comprising a computer program product, wherein the computer program product is configured to adapt the first set of processing parameters based on the first set of processing parameters and the second set of processing parameters when the computer program product is executed on the processor, and wherein the processor comprises at least one of an application-specific integrated circuit (ASIC), a field-programmable gate array (FPGA), a digital signal processor (DSP), a single purpose processor (SPP), or a general purpose processor (GPP).

11. The electronic device of claim 1, wherein the processing parameters comprise at least one of a center frequency, a frequency range, a waveform, an amplitude range, a trigger condition, a trigger mask, a display zoom, a display resolution, a display axis parameter, an display axis scaling factor, a plot range, or a time scaling factor.

12. The electronic device of claim 1, wherein the signal processing circuit comprises at least one of an application-specific integrated circuit (ASIC), a field-programmable gate array (FPGA), a digital signal processor (DSP), a single purpose processor (SPP), a general purpose processor (GPP), or a memory comprising executable instructions, the executable instructions being configured to process the input signal when the executable instructions is executed on the general purpose processor, and/or wherein the artificial intelligence circuit comprises at least one processor and a memory, the memory comprising executable instructions, wherein the executable instructions are configured to automatically adapt the processing parameters of the signal processing circuit based on the first user input when the executable instructions are executed on the processor, and wherein the executable instructions are configured to adapt the first set of processing parameters based on the first set of processing parameters and the second set of processing parameters when the executable instructions are executed on the processor, and wherein the processor comprises at least one of an application-specific integrated circuit (ASIC), a field-programmable gate array (FPGA), a digital signal processor (DSP), a single purpose processor (SPP), or a general purpose processor (GPP).

13. A method of setting processing parameters of an electronic device, the electronic device comprising a signal input, a user interface, a signal processing circuit, and an artificial intelligence circuit, the method comprising:

receiving an input signal via the signal input;

receiving a first user input via the user interface, wherein the first user input is associated with an automatic setting of processing parameters of the signal processing circuit, which are used by the signal processing circuit for processing the input signal;

automatically adapting the processing parameters of the signal processing circuit based on the first user input by the artificial intelligence circuit, thereby obtaining a first set of processing parameters;

processing the input signal by the signal processing circuit, thereby obtaining a graphic representation associated with the input signal;

receiving a second user input via the user interface, wherein the second user input is associated with an adjustment of the processing parameters of the signal processing circuit;

adapting the processing parameters of the signal processing circuit based on the second user input by the user interface, thereby obtaining a second set of processing parameters; and adapting the first set of processing parameters based on the first set of processing parameters and the second set of processing parameters by the artificial intelligence circuit, thereby obtaining an adapted set of processing parameters.

14. The method of claim 13, wherein the first set of processing parameters is adapted based on the input signal by the artificial intelligence circuit.

15. The method of claim 13, wherein the input signal is a measurement signal to be analyzed or an RF signal to be received.

16. The method of claim 13, wherein the first user input comprises operating an auto-set button of the user interface.

17. The method of claim 16, wherein the second user input comprises operating the auto-set button a second time.

18. The method of claim 13, wherein a time between the first user input and the second user input is determined by the user interface.

19. The method of claim 13, wherein the artificial intelligence circuit comprises a machine-learning circuit.

20. The method of claim 19, wherein the first set of processing parameters is automatically adapted via a machine-learning technique by the machine-learning circuit and/or wherein the machine-learning circuit is pre-trained to automatically adapt the processing parameters of the signal processing circuit.

* * * * *